Nov. 3, 1942.  M. V. ANDREWS  2,300,762
AUTOMATIC MOTORCYCLE STAND RETRACTOR
Filed Oct. 12, 1940
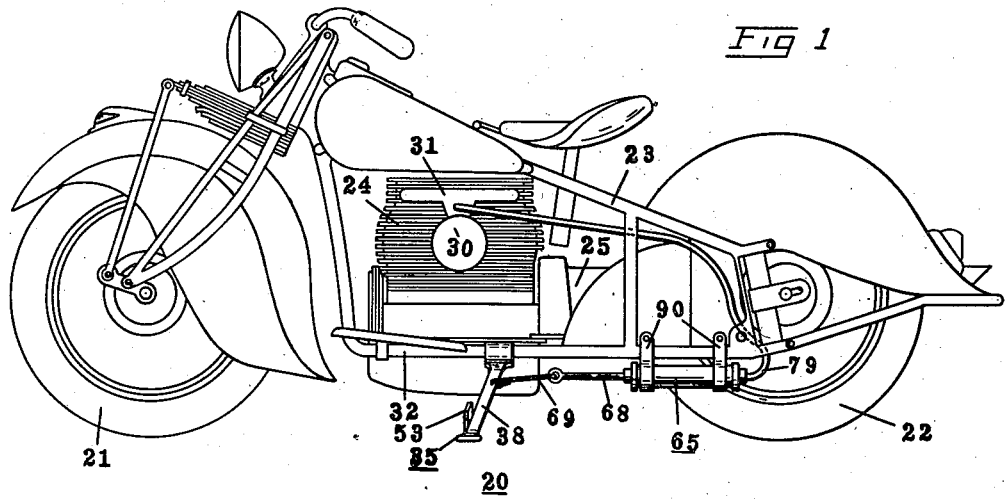
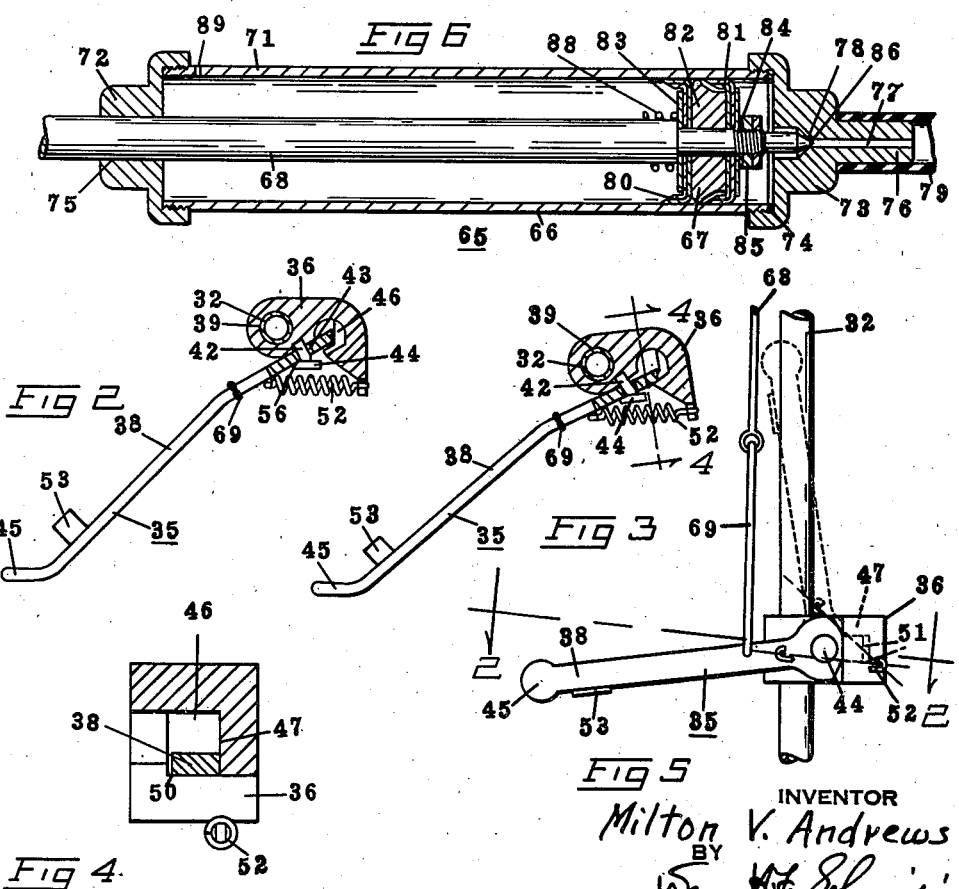
INVENTOR
Milton V. Andrews
BY
ATTORNEY Patented Nov. 3, 1942

2,300,762

UNITED STATES PATENT OFFICE 2,300,762

AUTOMATIC MOTORCYCLE STAND RETRACTOR

Milton V. Andrews, Newark, Ohio, assignor of one-half to Charles D. Pfeffer, Newark, Ohio Application October 12, 1940, Serial No. 360,966

8 Claims. (Cl. 280—301)

The present invention relates to motorcycles and more particularly to an improved standard for motorcycles.

Motorcycles are generally provided with standards for supporting the motorcycles when they are not in use. The standard usually comprises a bar or rod which is pivotally attached to the lower portion of the motorcycle frame and is movable to a laterally, downwardly extending position so that the motorcycle can be tilted against and rest upon the bar. When the motorcycle is in use, the bar is swung upwardly and along the frame so that it will not interfere with the running of the motorcycle. Often the cyclist neglects to move the standard to its raised position and when a banked turn is made the standard strikes the ground and causes the motorcycle to be thrown to the ground, generally with serious consequences to both the cyclist and the motorcycle.

It is an object of my invention to provide a device responsive to an operating condition of the engine of the motorcycle for moving the standard to its raised position when the motorcycle is in its running position.

Another object of my invention is to provide mechanism for resiliently urging the standard toward its raised position in response to an operating condition of the motor so that the motor can be operated while the standard is in its supporting, or lowered position, but which will raise the standard to its inoperative position when the weight of the motorcycle is removed from the standard.

In carrying out the above object, it is an object of the invention to provide a device comprising a cylinder and piston, and connecting the piston to the standard, and the cylinder with the intake manifold of the motorcycle engine so that a low pressure will be produced in the cylinder when the engine is operating to cause the piston to move the standard to its raised position.

Still another object of the invention is to provide mechanism for retaining the standard in its raised position and for connecting the movable element of the device for raising the standard by a flexible connection so that the standard cannot be moved to its lowered position by the action of the device.

A still further object of the invention is to provide a valve for controlling the withdrawal of gas from the cylinder of the device for raising the standard to the intake manifold, the valve being operated to close the conduit between the cylinder and intake manifold when the piston is moved to raise the standard.

Other and further objects and advantages will be apparent from the following description, reference being had to the accompanying drawing wherein a preferred form of embodiment of the present invention is clearly shown.

In the drawing:

Fig. 1 is a side view, in elevation, showing a motorcycle supported by the improved standard;

Fig. 2 is a view, partly in section and on a larger scale, of the motorcycle standard shown in Fig. 1 mounted on the frame of the motorcycle, the section being taken substantially on line 2—2 of Fig. 5;

Fig. 3 is a view similar to Fig. 2, but showing the parts of the standard in different positions;

Fig. 4 is a view taken on line 4—4 of Fig. 3;

Fig. 5 is a bottom plan view of the motorcycle standard and a fragment of the motorcycle frame, showing the standard in its supporting position and indicating by the dotted lines the position of the standard in its raised or non-supporting position, and Fig. 6 is a view, in section, of the actuating device for the standard.

Although the invention might be embodied in different forms and applied to different types of motorcycles, or similar type vehicles, I have shown a preferred embodiment of the invention in the drawing in which a motorcycle is shown generally at 20. The motorcycle 20 is the usual type and includes front and rear wheels 21 and 22, a frame 23 and a multi-cylinder internal combustion type engine 24. The engine 24 is connected to the rear wheel 22 by driving mechanism 25 and a chain. The various control members of the driving mechanism have not been shown for the sake of clarity. The engine 24 is provided with the usual carbureter 30 and an intake manifold 31. The frame 23 includes two parallel, substantially horizontal extending tubular members 32, only one appearing in the drawing, and the engine 24 is supported between these two members.

The motorcycle is supported substantially upright when it is not in use by a standard 35 which is attached to the frame 23 of the motorcycle. The standard 35 comprises a bracket 36 attached to one of the frame members 32 and a rigid shaft 38, preferably formed of steel, pivotally attached to the bracket.

The bracket 36 is attached to the member 32 by providing an opening 39 through the bracket and extending the frame member 32 through the opening and welding or otherwise attaching the walls of the opening to the member. The shaft 38 is pivotally attached to the bracket by a stud 42 that extends from the bracket and through an opening 43 in the shaft 38. The stud 42 is provided with a head 44 for retaining the shaft on the stud. The diameter of the opening 43 is larger than the diameter of the stud 42 so that a loose pivot is formed for the shaft. The stud 42 extends inwardly and downwardly with respect to the motorcycle frame so that the shaft 38 can be raised to extend alongside the frame member 32, as illustrated in the dotted lines in Fig. 5, or the shaft can be lowered to a position in which it extends downwardly and outwardly with respect to the motorcycle frame as is illustrated in Figs. 1 to 3. Preferably the shaft is formed having a foot 45 at the lower end thereof for contacting the ground when the shaft is lowered.

When the shaft 38 is moved about its pivot to the lowered position, the upper end of the shaft extends into a recess 46 formed in the bracket 36 and abuts a stop 47 formed by a wall of the recess. The lower end of the shaft 38 extends forwardly of the pivot for the shaft when the shaft is in the lowered position so that the weight of the motorcycle will force the upper end of the shaft against the stop 47. A slot 50 is formed in the recess 46 and when the shaft 38 abuts the stop 47 and the motorcycle is tilted against the shaft, the end of the shaft enters the slot. This locks the shaft 38 in its lowered or supporting position.

The shaft 38 is biased in either the raised or lowered positions by a spring 52 interconnecting the bracket 36 and the shaft 38. The spring 52 is positioned with respect to the stud 42 so that when the shaft is rotated toward the lowered position, the spring will be moved beyond the center of the stud and bias the shaft against the stop 47, and when the shaft is moved toward the raised position, the spring is moved to the opposite side of the center of the stud and the spring then biases the shaft in the raised position. A lug 53 on the shaft 38 engages the frame member 32 for limiting the upward movement of the shaft by the spring. The spring 52 is illustrated by broken lines 51 in Fig. 5. The spring 52 also biases the lower end of the shaft 38 inwardly and against a chamfered surface 56 formed on the head 44 so that when the weight of the motorcycle is removed from the shaft, the upper end of the shaft will be removed from the slot 50 to permit the shaft to be moved to the raised position.

I have provided a device for automatically moving the shaft 38 toward its raised position, when the weight of the motorcycle is removed from the shaft and in response to an operative condition of the engine 24 so that as the cyclist raises the motorcycle upright from its supported position, and the engine is operating, the shaft 38 will be retracted alongside the frame member 32. In the preferred embodiment of the invention, I provide a device 65 operated by the suction of the intake of the engine 24 for moving the shaft to its non-supporting position.

The device 65 comprises a cylinder 66 having a piston 67 mounted on a piston rod 68. The piston 67 is connected to the shaft 38 by the piston rod 68 and a flexible link 69 formed of cable wire. The connections at both ends of the link 69 are loop connections to permit free movement of the link. Any suitable swivel connections can be employed, however.

The cylinder 66 is formed by a tubular member 71 threaded at either end and a cap 72 is threaded on one end and a cap 73 on the opposite end. A sealing gasket 74 is interposed between the end of the tube and cap 73. The cap 72 is provided with an opening 75 and forms a bushing for guiding the rod 68. The cap 73 is formed having a nipple 76 and an opening 77. A valve seat 78 is formed at the inner end of the opening 77. A tube 79 is connected over the nipple 76 at one end and to the intake manifold 31 at the other end. The tube 79 is preferably formed of rubber, although other type tubes would be suitable.

The piston 67 comprises two sets of leather washers 80 and 81 mounted on a reduced portion of the rod 68 and separated by a guide washer 82. Metal plates 83 and 84 are provided for maintaining the peripheries of the washers 80 and 81 in engagement with the walls of the cylinder. The elements forming the piston are compressed together by lock nuts 85 threaded on the piston rod. The end of the piston rod 68 is pointed and forms a valve 86 for closing on the valve seat 78 when the piston rod 68 is drawn to the right end of the cylinder. The valve 86 is guided by the guide washer 82.

A spring 88 is provided on the piston rod 68 for forming a resilient stop for the piston rod when the rod is moved to the left end of the cylinder. An opening 89 is formed in the tube 71 adjacent the left end thereof for the intake and venting of air from the tube as the piston is reciprocated.

The cylinder 66 is mounted to the frame of the motorcycle by suitable brackets shown at 90.

When the rod 38 is moved to its lowered position the piston 67 is drawn to the left end of the cylinder 66. When the engine 24 is started, air is exhausted from the cylinder through the tube 79 connected to the intake manifold and the piston 67 is urged toward the left end of the cylinder and resiliently urges the shaft 38 toward its raised position. As long as the motorcycle is tilted against the shaft 38, however, the shaft 38 will be locked in the supporting position.

When the motorcycle is raised substantially upright, i. e., to its normal running position, the end of the shaft 38 is released from the slot 50 and the piston 67 then draws the shaft 38 toward its raised position and the spring 52 moves and retains the shaft to the fully raised position. When this occurs, the piston rod 68 is moved to the right and the valve 86 closes the passage 77 to prevent air from being taken into the intake manifold through the cylinder 66. The passage 77 is preferably of such diameter that in case of a backfire in the engine 24, insufficient gas will be transmitted to the cylinder to drive the piston rod 68 outwardly. Moreover, if the piston should be driven outwardly for any reason the flexible link 69 would prevent lowering of the shaft 38.

By operating the device 65 through the operation of the engine of the motorcycle, the standard is resiliently urged to its non-supporting position when the engine is operating and when the motorcycle is raised from the standard the standard is immediately moved to its non-supporting position. Thus the engine may be started while the motorcycle is supported by the standard but as soon as the cyclist raises the cycle to the upright position for driving, the standard is raised automatically.

While the form of embodiment of the present invention as herein disclosed constitutes a preferred form, it is to be understood that other forms might be adopted, all coming within the scope of the claims which follow.

I claim:

1. In combination, an internal combustion engine driven motorcycle, a standard for the motorcycle, said standard being movable to an inoperative position; a device for moving the standard to said inoperative position including means forming a chamber and a member movable in the chamber by changes in pressure differential between the inside and outside of the chamber; means forming a conduit interconnecting the chamber with a gas passage of the engine; and means forming a valve for controlling said conduit, said valve being operated by said member to the closed position when the standard is moved to said inoperative position by the member.

2. In combination, an internal combustion engine driven motorcycle, a standard for the motorcycle, said standard being movable to an inoperative position; a device for moving the standard to said inoperative position including means forming a chamber and a member movable in the chamber by changes in pressure differential between the inside and outside of the chamber; means interconnecting said member and standard; means forming a conduit interconnecting the chamber with the intake manifold of the engine; and means forming a valve for controlling said conduit, said valve being operated by said member to the closed position when the standard is moved to said inoperative position by the member.

3. In combination, a motorcycle having an engine; means for supporting the motorcycle, said means including a member carried by the motorcycle and movable to a position in which it is engageable with the ground for supporting the motorcycle in a tilted, non-running position, said member being movable to a non-supporting position; means responsive to a condition incident to operation of the motorcycle engine for urging said member toward said non-supporting position when the motorcycle engine is operating; and means for causing said member to be maintained in said first mentioned position regardless of the effect of the second mentioned means on said member while the motorcycle is supported by the member in said tilted, non-running position.

4. In combination, a motorcycle having an engine; means for supporting the motorcycle, said means including a member carried by the motorcycle and movable to a position in which it is engageable with the ground for supporting the motorcycle in a tilted, non-running position, said member being movable to a non-supporting position; means responsive to a condition incident to operation of the motorcycle engine for urging said member toward said second mentioned position when the motorcycle engine is operating; and means for locking said member in said first mentioned position when the motorcycle is supported by the member in said tilted, non-running position whereby the second mentioned means is ineffective to move said member toward the second mentioned position, said third mentioned means being adapted to release said member for movement by the second mentioned means when the motorcycle is moved toward vertical position.

5. In combination, a motorcycle having an internal combustion type engine, including an intake manifold; means for supporting the motorcycle, said means including a member carried by the motorcycle and movable to a position in which it is engageable with the ground for supporting the motorcycle in a tilted, non-running position, said member being movable to a non-supporting position; means actuated by the change in pressure within the intake manifold of the motorcycle engine when said engine is started, for urging said member toward said non-supporting position when the motorcycle engine is operating; and means for causing said member to be maintained in said first mentioned position regardless of the effect of the second mentioned means on said member while the motorcycle is supported by the member in said tilted, non-running position.

6. In combination, a motorcycle having an engine; means for supporting the motorcycle, said means including a member carried by the motorcycle and movable to a position in which it is engageable with the ground for supporting the motorcycle in a tilted, non-running position, said member being movable to a non-supporting position; means for yieldingly maintaining said member in a said non-supporting position; means responsive to a condition incident to operation of the motorcycle engine for urging said member toward said non-supporting position when the motorcycle engine is operating, the second mentioned means including, an actuating element movable in opposite directions and a flexible connection between said element and member for transmitting motion of said element to said member only when the element moves in one direction; and means for causing said member to be maintained in said first mentioned position regardless of the effect of the second mentioned means on said member while the motorcycle is supported by the member in said tilted, non-running position.

7. In combination, a motorcycle; means for supporting the motorcycle including, a member carried by the motorcycle and movable to a position in which it is engageable with the ground for supporting the motorcycle in a tilted, non-running position, said member being movable to a non-supporting position; and means for moving said member from the first mentioned position toward the second mentioned position including, an actuating element movable in opposite directions, and a flexible connecting link interconnecting said member and said element, said flexible link being capable of transmitting motion of said element to said member when the element moves in a direction for moving said member toward the second mentioned position and being incapable of transmitting motion of said element to said member when the element moves in the opposite direction.

8. In combination, a motorcycle having an engine; means for supporting the motorcycle, said means including a member carried by the motorcycle and movable to a position in which it is engageable with the ground for supporting the motorcycle in a tilted, non-running position, said member being movable to a non-supporting position, said member being restrained from movement to said non-supporting position while bearing weight of the motorcycle; and means responsive to a condition incident to operation of the motorcycle engine for moving said member to said non-supporting position when weight of the motorcycle is substantially removed from the supporting member.

MILTON V. ANDREWS.